United States Patent
Jankowski et al.

(10) Patent No.: US 8,824,750 B2
(45) Date of Patent: Sep. 2, 2014

(54) DISTRIBUTIVE FACIAL MATCHING AND NOTIFICATION SYSTEM

(75) Inventors: Peter A. Jankowski, Rancho Santa Fe, CA (US); Chen-Lan Yen, Carlsbad, CA (US)

(73) Assignee: Next Level Security Systems, Inc., Carlsbad, CA (US)

( * ) Notice: Subject to any disclaimer, the term of this patent is extended or adjusted under 35 U.S.C. 154(b) by 175 days.

(21) Appl. No.: 13/423,815

(22) Filed: Mar. 19, 2012

(65) Prior Publication Data

US 2013/0243269 A1 Sep. 19, 2013

(51) Int. Cl.
*G06K 9/00* (2006.01)

(52) U.S. Cl.
CPC ..................... *G06K 9/00* (2013.01)
USPC ........... 382/118; 348/143; 348/207; 370/338; 370/401

(58) Field of Classification Search
CPC ............... H04L 61/3075; H04L 29/08144; H04L 67/2804; H04L 61/2038; H04L 63/123; H04L 2209/60; H04L 67/36; H04W 48/18; H04W 88/16; H04W 52/50; G06Q 30/0281; G06Q 20/027; G08B 13/19658; G06K 9/00979
USPC ..................... 382/118; 348/143; 370/338, 401
See application file for complete search history.

(56) References Cited

U.S. PATENT DOCUMENTS

| | | | |
|---|---|---|---|
| 5,873,077 A * | 2/1999 | Kanoh et al. ......................... 1/1 |
| 6,785,653 B1 * | 8/2004 | White et al. ................ 704/270.1 |
| 6,807,158 B2 * | 10/2004 | Krishnamurthy et al. ..... 370/316 |
| 6,975,346 B2 | 12/2005 | Kumhyr |
| 7,697,951 B1 * | 4/2010 | Martin et al. .................. 455/519 |
| 8,106,764 B2 * | 1/2012 | Hershkovitz et al. ......... 340/531 |
| 8,117,314 B2 * | 2/2012 | Croft et al. .................... 709/227 |
| 8,340,260 B1 * | 12/2012 | Rae et al. ....................... 379/189 |
| 2003/0053424 A1 * | 3/2003 | Krishnamurthy et al. ..... 370/316 |
| 2004/0109063 A1 | 6/2004 | Kusaka et al. |
| 2005/0226258 A1 | 10/2005 | Chischportich et al. |
| 2006/0221190 A1 * | 10/2006 | Limberis et al. ........... 348/207.1 |
| 2006/0279628 A1 * | 12/2006 | Fleming ........................ 348/143 |
| 2006/0287872 A1 | 12/2006 | Simrell |
| 2007/0180496 A1 * | 8/2007 | Fransdonk ........................ 726/3 |
| 2007/0191033 A1 * | 8/2007 | Marais ........................... 455/466 |
| 2007/0198437 A1 * | 8/2007 | Eisner et al. ..................... 705/79 |
| 2008/0252722 A1 | 10/2008 | Wang et al. |

(Continued)

FOREIGN PATENT DOCUMENTS

WO WO-2013/141985 A1 9/2013

OTHER PUBLICATIONS

International Application Serial No. PCT/US2013/026270, International Search Report mailed Apr. 26, 2013, 2 pgs.

(Continued)

*Primary Examiner* — Vu Le
*Assistant Examiner* — Aklilu Woldemariam
(74) *Attorney, Agent, or Firm* — Schwegman Lundberg & Woessner, P.A.

(57) ABSTRACT

A method and a system for distributing facial identifiers to gateways are described. The system has one or more gateways and a web server associate with the gateways. Each gateway is coupled to a video capturing device. The web server identifies one or more gateways using a metadata associated with a picture of a face. The web server then distributes the picture of the face and the metadata to the identified gateways.

18 Claims, 12 Drawing Sheets

(56) References Cited

U.S. PATENT DOCUMENTS

| | | |
|---|---|---|
| 2009/0074258 A1 | 3/2009 | Cotgreave |
| 2009/0153660 A1 | 6/2009 | Liu |
| 2009/0252383 A1 | 10/2009 | Adam et al. |
| 2010/0054222 A1 | 3/2010 | Rune |
| 2010/0115427 A1* | 5/2010 | Schroeter et al. ............. 715/757 |
| 2010/0239130 A1 | 9/2010 | Chen et al. |
| 2011/0099633 A1* | 4/2011 | Aziz ............................... 726/24 |

OTHER PUBLICATIONS

International Application Serial No. PCT/US2013/026270, Written Opinion mailed Apr. 26, 2013, 8 pgs.

* cited by examiner

| GATEWAY 200 | | | |
|---|---|---|---|
| CAMERA API 212 | ACCESS CONTROL API 216 | OTHER API 222 | . . . . . |
| CAMERA MODULE 214 | ACCESS CONTROL MODULE 218 | OTHER MODULE 224 | . . . . . |
| CAMERA DRIVERS 216 | ACCESS CONTROL DRIVERS 220 | OTHER DRIVERS 226 | . . . . . |

(API / MODULES / DRIVERS)

DISTRIBUTIVE FACIAL MATCHING AND NOTIFICATION SYSTEM

TECHNICAL FIELD

This application relates generally to the field of computer technology, and in a specific example embodiment, a distributive facial matching and notification system.

BACKGROUND

Systems for monitoring and/or controlling security devices have become increasingly popular in recent years. Such systems are used to communicate with security devices such as lights, thermostats, or security systems.

Some conventional systems for controlling and monitoring security devices allow a user to access a server from a remote location using a device such as a desktop computer. For example, a user can use a desktop computer located in a remote location to connect with the server. The user can then send commands to the server to control various security devices. For example, the user can turn lights on or off. In another example, the user accesses a video feed stored at the server that receives a video stream from a camera at a monitored location.

Such conventional systems for controlling and/or monitoring security devices have at least the following disadvantages and limitations. The connection between the user's remote computer and the server may not be secured. A user could establish a secure connection, but the cost and complexity involved in establishing such a connection are high. Such systems are also complex for users to implement and maintain. For example, the server may be difficult to install and configure. Programming such systems can also be cumbersome and require custom configurations when adding supplemental security devices or services. Last, it is difficult for the user to access the server using different types of remote devices. For instance, conventional systems only allow a user to access the offsite server using, for example, a secured desktop computer located in the user's workplace.

BRIEF DESCRIPTION OF THE DRAWINGS

The present invention is illustrated by way of example, and not by way of limitation, in the figures of the accompanying drawings in which:

FIG. 2B is a block diagram illustrating another example embodiment of a gateway;

DETAILED DESCRIPTION

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

In various embodiments, a method and a system for distributing facial identifiers to gateways are described. In one example, the system has one or more gateways and a web server associate with the gateways. Each gateway is coupled to a video capturing device. The web server identifies one or more gateways using a metadata associated with a picture of a face. In one embodiment, metadata includes an identification of the picture of the face (e.g., name, age, address, type of person and so forth) and a geographic location of interest (e.g., county, area code, zip code, building location, floor, and so forth). The type of person may include for example, registered sex offenders, persons with Alzheimer, and other types of persons of interest. The web server then distributes the picture of the face and the metadata to the identified gateways.

Figure 1:
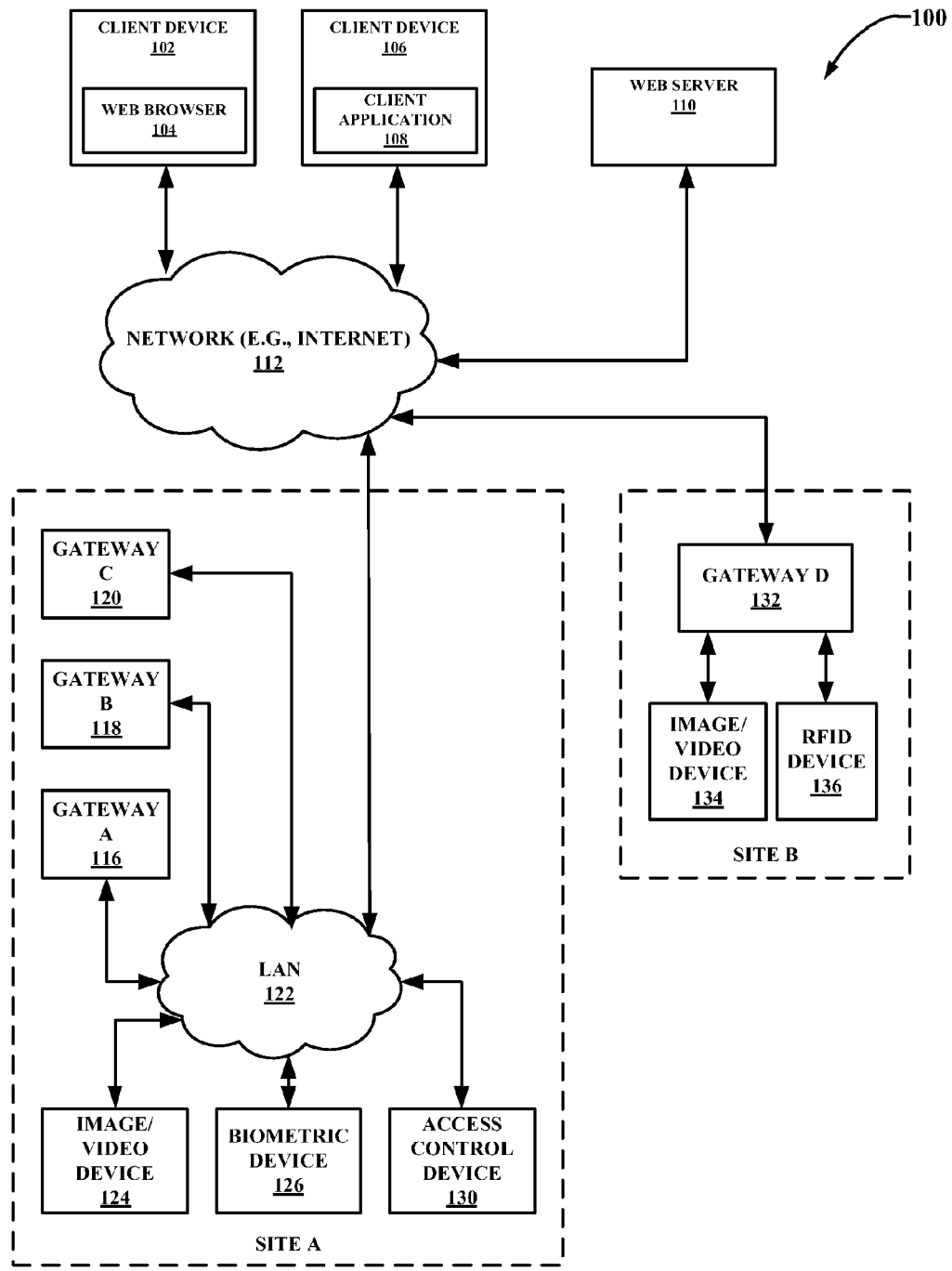
FIG. 1 is a network diagram depicting a network system, according to one embodiment, for exchanging data over a network.

FIG. 1 is a network diagram depicting a network system 100, according to one embodiment, for exchanging data over a computer network 112 (e.g. TCP/IP network). For example, the network system 100 comprises client devices 102, 106, a web server 110, and gateways 116, 118, 120 at a location site A, and a gateway 132 at a location site B. For example, location site A may be a store in a city and location site B may be an office in another city. A location site may include, for example, one or more floors of an office building, a residential house, an area of a factory or retail space, and so forth. In another example, location sites may overlap each other.

For purposes of the present embodiment, the terms "sites" and "premises" refer to any location to be monitored, whether residential, commercial, public, or secured. Further, the term "a" is generally used in the present disclosure to mean one or more. Still further, the terms "coupled" and "operatively coupled" mean connected in such a way that data may be exchanged. It is understood that "coupled" and "operatively coupled" do not require a direct connection, a wired connection, or even a permanent connection. It is sufficient for purposes of the present embodiment that the connection(s) be established for the sole purpose of exchanging information.

The client devices 102, 106 are connected to the computer network 112. The client devices 102, 106 can include, but are not limited to, a desktop computer, a laptop computer, a mobile computing device, a mobile smart phone device, and so forth. A network interface means is provided to enable the client devices 102, 106 to send and receive data to and from the computer network 112. The client device 102 may include a web browser 104 that may be in communication with the web server 110 via the computer network 112. In another example, the client device 106 includes a programmatic client, such as a client application 108 configured to communicate with the web server 110 via the computer network 112. The web browser 104 or the client application 108 may be used to display some or all of the information and monitoring data provided by gateways 116, 118, 120, and 132.

The computer network 112 can include a local area network (LAN) where Gigabit Ethernet switches are used to switch data. In another example, the computer network 112 includes a wide area network, such as the Internet. In general, computer network 112 may be a public network or private network, a single network or a combination of several networks. In most embodiments, computer network 120 may be, but is not required to be, an IP-based network. In some embodiments it may be desirable for all or a portion of network 120 to include publicly available networks, such as the Internet, to avoid the need for installing, purchasing, or leasing additional infrastructure.

The web server 110 may also connect to the computer network 112 both to receive and transmit data. The web server 110 may also be referred to as a web-based host. The web server 110 is connected to the computer network 112 by a means of a network interface. The network interface can take the form of a network interface card (not shown) installed within the web server 110 to enable data to sent and received to and from the computer network 112 by the web server 110.

In one embodiment, the web server 110 identifies one or more gateway(s) for the client devices 102, 106 to communicate with, so as to monitor and/or control the security devices connected to the corresponding gateway(s).

In another embodiment, the web server 110 may provide server-side functionality, via the computer network 112, to the client devices 102, 106. The client devices 102, 106 may enable users that utilize the network system 100 and more specifically, the web server 110, to view monitoring data (e.g. audio/video feed) from security devices connected to gateways 116, 118, 120, and 132 over the computer network 112. These transactions may include transmitting, receiving (communicating) and processing data to, from, and regarding monitoring data and users of the network system 100. The data may include, but are not limited to audio, video, picture, metadata, camera configuration data, client device configuration data, and network data monitoring data. The web server 110 can provide other functions including storing monitoring data to an internal or external disk storage device (not shown), playing back recorded monitoring data.

In one embodiment, the web server 110 may include a directory of gateways and the location of corresponding connected security devices. The web server 110 is described in more detail below with respect to FIGS. 2A, 2B, and 2C. As such, the web server 110 may correlate the gateway 116 at site A to the gateway 132 at site B. In one embodiment, the correlation may be generated pursuant to pre-defined settings or configuration based on user profile, organization topology, hierarchy, bandwidth and other factors. For example, a user at client device 102 may be a manager responsible for stores located on the West coast. If both sites A and B are on the West coast, the web server correlates gateway 116 to gateway 132. As such, based on the user profile and the organization topology, the user can access only gateway 116 to obtain monitoring data from sites A and B. In other words, the user does not have to communicate directly with several gateways to monitor all security devices attached to the corresponding gateways. In another embodiment, the web server 110 may correlate gateway 116 with other gateways. In yet another embodiment, the other gateways may be correlated with other gateways. For example, information from other gateways correlated with the gateway 132 which is correlated with gateway 116 may be communicated with the user at the client device 102 or 106.

Generally, gateways 116, 118, 120, and 132 include a processor-based device that operate to monitor conditions at a target site or premise, to analyze monitoring data, to detect alarm conditions at the target site or premise, to capture information relating to such alarm conditions, and to send such monitoring information to client devices 102, 106 and/or the web server 110.

Gateways 116, 118, and 120 are located at the same site A. In one embodiment, gateways 116, 118, 120 are capable of balancing their respective load. Furthermore, gateways 116, 118, 120 may provide a redundant backup of each other. Gateways 116, 118, 120 are connected to a local area network LAN 122. In another embodiment, gateways 116, 118, 120 communicate with one another via a peer-to-peer network. Gateways 116, 118, and 120 may provide a distributive processing system where a facial recognition process may be distributed to other gateways based on CPU usage and distance to each gateway.

Security devices (e.g. monitoring devices and controlling devices) 124, 126, and 130 are connected to the gateways 116, 118, 120 via LAN 122. Monitoring devices include, for example, video cameras. The gateways are not limited to connect to any specific type or model of sensors or monitoring devices. Any sensor may be used, depending on the desired type and level of protection. Examples include, without limitation, microphones, cameras, magnetic contact switches, audio sensors, infrared sensors, motion detectors, fire alarms, and carbon monoxide sensors. For illustration purposes, location site A in FIG. 1 includes a video capturing device 124, a biometric device 126 (e.g. fingerprint reader), and an access control device 130 (e.g. door/gate access sensor).

In addition, controlling devices may include devices that can be controlled such as a HVAC system (e.g. heater/air conditioning system including thermometer, smoke sensor, thermostat), a gate/door lock, a camera positioning system (e.g. tilt, pan).

The video capturing device 124, the biometric devices 126, and the access control device 130 are located at site A and are connected to the gateway 116 via LAN 122.

The gateway 132 is located at another location site B away from location site A (e.g. different physical locations). Another video capturing device 134 (e.g. video camera, photographic camera) and an RFID device 136 (e.g. card reader) are directly connected to gateway 132. The gateway 132 communicates with the computer network 112.

In another embodiment, gateways 116, 118, and 120 from site A communicate with the gateway 132 from site B. As such, client devices 102, 106 can monitor data from the video capturing device 134 and the RFID device 136 connected to the gateway 132 by communicating only with the gateway 116. Similarly, client devices 102, 106 can monitor data from the video capturing device 124, the biometric device 126, and the access control device 130 connected to gateway 116 by communicating only with the gateway 132.

Figure 2A:
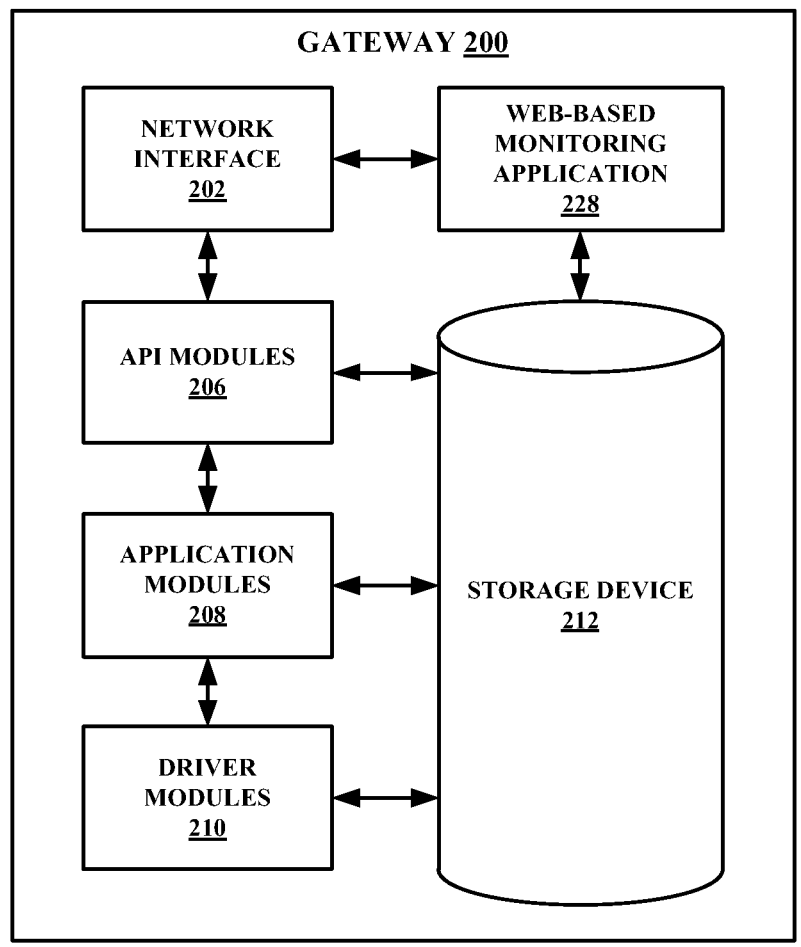
FIG. 2A is a block diagram illustrating an example embodiment of a gateway.

FIG. 2A is a block diagram illustrating an example embodiment of a gateway 200. The gateway 200 includes a network interface 202, API modules 206, application modules 208, driver modules 210, a web-based monitoring application 228, and a storage device 212.

The network interface 202 enables the gateway to communicate with the computer network 112.

The application programming interface (API) enable the gateway 200 to interface the gateway with the client devices 102, 106, the web server 110, and other third party devices (not shown).

The application modules 208 enable the gateway 200 to monitor or control the corresponding monitoring or controlling devices connected to the gateway 200. In addition, the application modules 208 enable the gateway 200 to provide add-on expandable services discussed further below. The driver modules 210 include device drivers to enable interaction of the application modules 208 with the hardware of the corresponding monitoring or controlling devices.

The web-based monitoring application 228 enables the gateway 200 to communicate monitoring and controlling data with the client device. The web-based monitoring application 228 is discussed in more detail with respect to FIG. 2C.

The storage device 212 may be used to store monitoring data from the monitoring devices connected to the gateway 200, APIs from API modules 206, software application from application modules 208, device drivers from driver modules 210, and a configuration of the gateway 200. For example, the configuration of the gateway 200 may include a topology or hierarchy of at a user level, organization level, partner level. The configuration of the gateway may include specifically an enterprise configuration of gateway (based on the topology/hierarchy previously mentioned). In one embodiment, the configuration of the gateway 200 may be replicated to other gateways that are correlated by the web server based on the topology/hierarchy. For example, some gateway can have access control to a limited number of security devices. In another embodiment, each gateway may be custom configured. In another embodiment, the gateway is configured to aggregate data from multiple gateways (that may be correlated by the web server 110 based on the topology) and present the aggregated data to the client device.

FIG. 2B is a block diagram illustrating another example embodiment of the gateway 200. For example, the gateway 200 includes a camera API 212, a camera application module 214, and camera drivers 216. The camera API 212 provides an interface to the web browser 104 or the client application 108 of the client device to receive and send data from a camera connected to the gateway 200. The camera application module 214 enables the client device to receive data (e.g. audio and video) from the camera via the camera API 212. In another embodiment, the camera application module 214 enables the client device to send data to the camera (e.g. focus, tilt, pan, zoom) to the camera via the camera API 212. The camera drivers 216 include one or more drivers for different brand or manufacturer of cameras.

In another example, the gateway 200 also includes an access control API 216, an access control application module 218, and access control drivers 220. The access control API 216 provides an interface to the web browser 104 or the client application 108 of the client device to receive and send data from an access control device (e.g. a door access at a monitored site) connected to the gateway 200. The access control module 218 enables the client device to receive data (e.g. time and ID log of the door access at the monitored site) from the access control device via the access control API 216. In another embodiment, the access control module 218 enables the client device to send data to the access control device (e.g. open, close, lock door) to the access control device via the access control API 216. The access control drivers 220 include one or more drivers for different brand or manufacturer of access control devices.

One advantage of one of the embodiments of the gateway 200 is the ability to easily connect additional devices or third party devices. This is illustrated with respect to other API 222, other module 224, and other drivers 226. As such, the gateway 200 is not limited to any particular manufacturer of devices or brand of devices. The gateway 200 allows for easy expansion and plug-in features using additional APIs, corresponding modules, and corresponding device drivers.

Figure 2C:
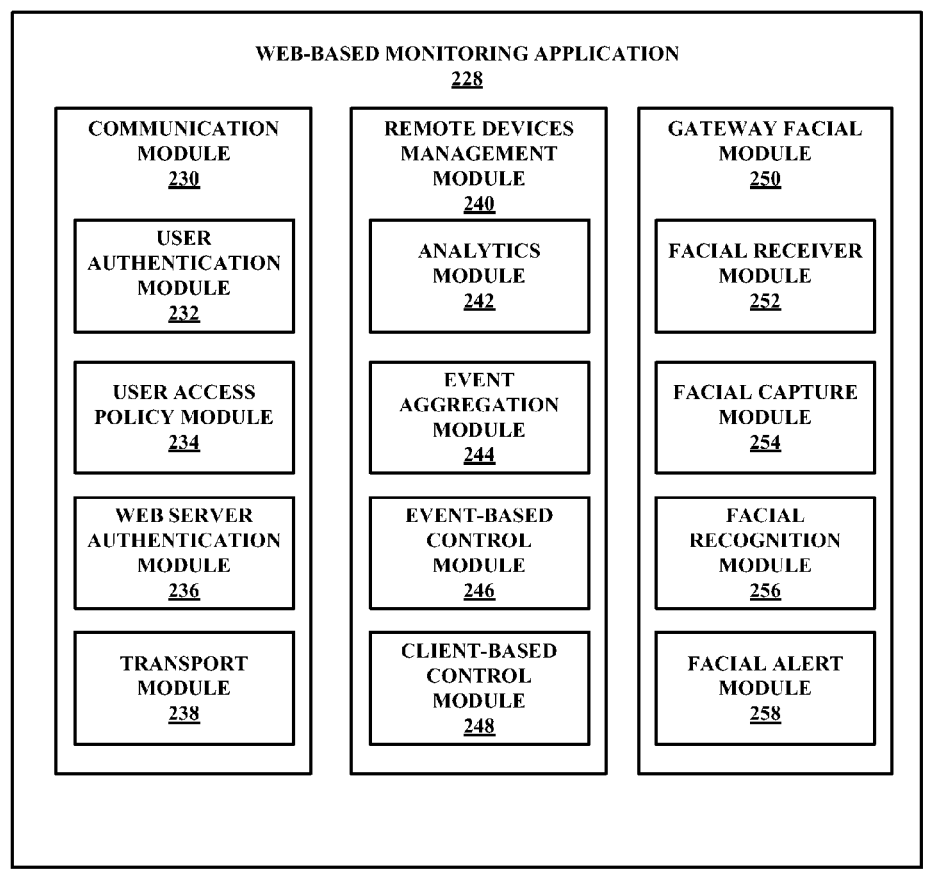
FIG. 2C is a block diagram illustrating an example embodiment of a web-based monitoring application of a gateway.

FIG. 2C is a block diagram illustrating an example embodiment of a web-based monitoring application 228 of the gateway 200. The web-based monitoring application 228 enables client devices to remotely monitor and control monitoring and controlling devices connected to the gateway 200 via the web browser 104 or the client application 108 at the client devices 102, 106.

In one embodiment, the web-based monitoring application 228 includes a communication module 230, a remote devices management module 240, and a gateway facial module 250. The communication module 230 enables communication between the gateway 200 and the client devices 102, 106. The remote devices management module 240 enables the client devices 102, 106 to monitor or control the monitoring or controlling devices connected to the gateway 200. The gateway facial module 230 enables the gateway 200 to process facial recognition based on information received from the web server 110.

In one embodiment, the communication module 230 includes a user authentication module 232, a user access policy module 234, a web server authentication module 236, and a transport module 238.

The user authentication module 232 authenticates a user at the client device based on a user profile of the user. An example of user authentication may include verifying the username and password provided by the client device with a predefined user profile. The predefined user profile may be stored in the storage device 212 or at the web server 110.

The user access policy module 234 limits or grants the user at the client device access to the monitoring and/or controlling devices connected to the gateway. For example, a user with limited privilege may have access to the monitoring data to a particular site (e.g. first floor only) or a specific monitoring device (e.g. HVAC only). On the other hand, a user with executive privilege may not only be able to view monitoring data and control security devices from more sites.

The web server authentication module 236 authenticates a communication between the gateway 200 and the web server 110. For example, the gateway transmits a unique token to the web server 110 for authentication prior to establishing the secured communication. Those of ordinary skills in the art will recognize that other means of authentication between the gateway and the web server 110 may be used.

The transport module 238 enables peer-to-peer communication between gateways. As such, a client device communicating with one gateway at a first location is also able to communicate with another gateway at a second location.

In one embodiment, the remote device management module 240 of the web-based monitoring application 228 includes an analytics module 242, an event aggregation module 244, an event-based control module 246, and a client-based control module 248.

The analytics module 242 analyzes audio/video, and other detected changes from the monitoring devices and generates events based on the analysis. For example, the analytics module 242 is capable of determining how many people have entered or left an activity zone (e.g. a room, a hallway) in a video feed, the direction of the movement of individuals in a video feed, the temperature of individuals in a video feed, facial recognition of individual in a video feed, and so forth. Events are generated based on the analysis and predefined user-configured settings. A user at the client device is able to configure the conditions for generating an event from the web browser 104 of the client device 102 or the client application 108 of the client device 106.

The event aggregation module 244 aggregates events generated from the analytics module 242. For example, events generated based on the analysis and predefined/user-configured settings are aggregated in a log stored in a storage device attached to the gateway, in a storage device attached to another gateway, in a storage device attached to the web server 110, or in a storage device connected to the client device.

The event-based control module 246 communicates a command to at least one controlling device connected to the corresponding gateway based on an event identified in event aggregation module 244 based on an event configuration. For example, an event comprises a temperature of a room reaching a predefined maximum temperature. The event-based control module 246 may communicate to the HVAC system to turn on the air conditioning system for the room if such event occurs.

The client-based control module 248 communicates a command to one or more controlling devices of the corresponding gateway based on a command initiated and communicated from the client device. For example, a user at the client device may initiate a command to pan a camera connected to the gateway. Such command would be communicated to the camera via the client-based control module 248.

In one embodiment, the gateway facial module 250 of the web-based monitoring application 228 includes a facial receiver module 252, a facial capture module 254, a facial recognition module 256, and a facial alert module 256.

The facial receiver module 252 receives a picture of a face and metadata associated with the picture of the face from the web server 110. In another embodiment, the facial receiver module 252 receives facial features and metadata from the web server 110.

The facial capture module 254 monitors video from its connected video recording devices and captures pictures of a face of person in the video feed.

The facial recognition module 256 determines facial features from the captured pictures of the faces and from the picture of the face received from the web server 110. The facial recognition module 256 then compares the facial features from the captured pictures of the faces from the video feed with the facial features from the picture of the face received from the web server 110. In another embodiment, the facial recognition module 256 compares the facial features from the captured picture of the face with the facial features received from the web server 110.

In another embodiment, the facial capture module 254 captures a picture of a face with the video recording device connected to the gateway 200 and communicates the captured picture of the face to the web server 110.

In another embodiment, the facial capture module 254 captures a picture of a face with the video recording device and the facial recognition module 256 determines facial features from the captured picture of the face and communicates the captured picture of the face to the web server 110 for processing at the web server 110.

In yet another embodiment, the facial capture module 254 may distribute the facial recognition processing (e.g., facial features computation and/or comparison) to other related gateways based on their load and distance. For example, a gateway located in a building may distribute a facial recognition processing to other gateways located in other buildings on a company campus.

Figure 3A:
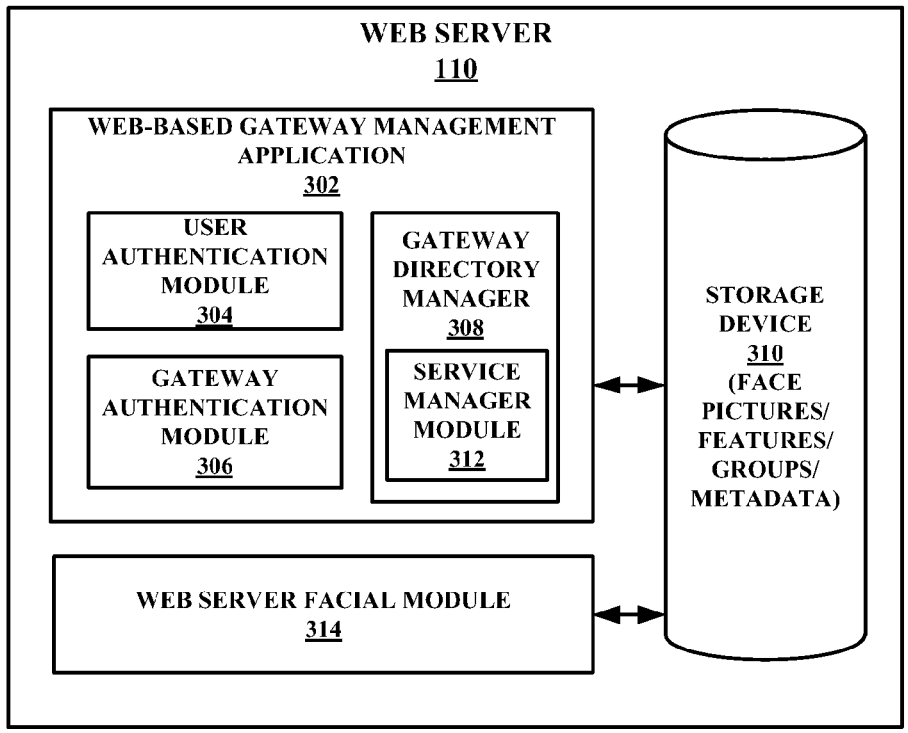
FIG. 3A is a block diagram illustrating an example embodiment of a web server.

FIG. 3A is a block diagram illustrating an example embodiment of a web server 110 also referred to as a web-based host. The web server 110 comprises a web-based gateway management application 302 and a storage device 310. The web-based gateway management application 302 identifies a gateway associated with a user at the client device, authenticates with the user at the client device, and authenticates with the identified gateway.

In one embodiment, the web-based gateway management application 302 includes a gateway directory manager 308, a user authentication module 304, and a gateway authentication module 306. The gateway directory manager 308 identifies a gateway associated with a user profile. For example, a user may only be able to access a particular gateway or a particular set of devices connected to a gateway. As such, a west coast manager of an organization may be able to access monitored sites only from west coast stores of the organization. In contrast, a user with higher privileges may be able to access more gateways and devices. As such, the CEO of an organization with stores throughout the U.S. may be able to view monitoring data from all the stores in the U.S.

In another embodiment, the gateway directory manager 308 includes a service manager module 312 to enable add-on services to the user at the client device. For example, the add-on services include, but are not limited to, remote storage, remote audio, two-way audio, dynamic backup, or reporting based on the user profile.

The user authentication module 304 authenticates the web server 110 with the user at the client device based on the user profile. For example, the web server 110 verifies the username and password of the user at the client device.

The gateway authentication module 306 authenticates the identified gateway. For example, the web server 110 receives a unique token from the identified gateway to authenticate the identified gateway prior to establishing secured communication between the web server and the gateway.

The storage device 310 may be used to store user profiles, tokens from gateways, a directory of gateways with corresponding devices, services from the gateways, a directory of gateways associated with a user profile, and a directory of connected security devices associated with a user profile. In one embodiment, the storage device 310 further stores pictures of faces, corresponding features and metadata. The pictures, features, and metadata may be stored in a database and grouped or listed according to a user specified category. For example, separate groups may be created for child predators, suspects, criminals, person of interest, and so forth. The groups may be organized by geographic areas. For example, child predators located in a particular zip code are associated with corresponding gateways located in the corresponding zip codes. The web server 110 may also identify gateways located within a radius of the residence address of a child predator.

Figure 3B:
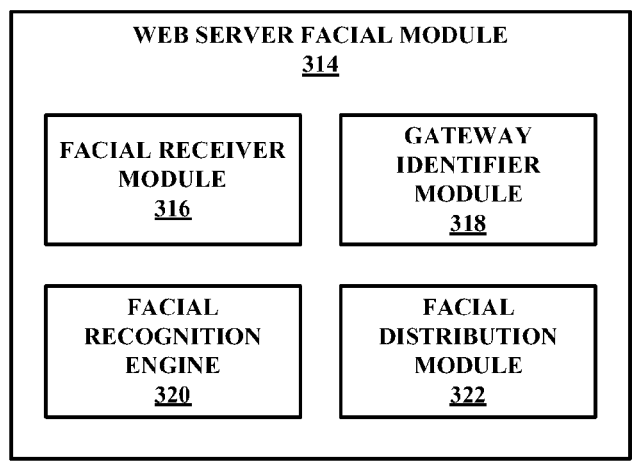
FIG. 3B is a block diagram illustrating an example embodiment of a web server facial module.

FIG. 3B is a block diagram illustrating an example embodiment of a web server facial module 314. The web server facial module 314 includes a facial receiver module 316, a gateway identifier module 318, a facial recognition engine 320, and a facial distribution module 322.

The facial receiver module 316 receives the picture of the face and the metadata from one or more sources (e.g., law enforcement authorities, agencies, or other databases). For example, the facial receiver module 316 may receive pictures of faces of suspects from an international agency such as Interpol, a national agency such as the Federal Bureau of Investigation (FBI), a local agency such as the local sheriff office. The facial receiver module 316 may also receive pictures of faces from private databases (for example, database of local suspected thieves, bad check writers, and so forth).

In another embodiment, the facial receiver module 316 receives a captured picture of a face and/or facial features from the captured picture of a face from the identified gateways for processing.

The facial recognition engine 320 determines facial features from the picture of the face. The facial recognition engine 320 compares the facial features from the captured picture of the face with the facial features from the picture of the face to determine a match. In another embodiment, the facial recognition engine 320 first determines facial features from the captured picture of the face and then compares the facial features from the captured picture of the face with the facial features from the picture of the face to determine a match.

The gateway identifier module 318 identifies the one or more gateways using the metadata. For example, if gateway located within a radius of a zip code in the metadata. The gateway identifier module 318 may communicate with a directory of gateways in a database. The directory of gateways may be grouped by physical/logical locations, company, entities, agencies, users, and so forth. In one embodiment, the gateways are registered with the web server 110.

The facial distribution module 322 communicates facial identifiers such as the picture of the face and/or facial features to the identified gateways. The facial distribution module 322 may also communicate the metadata associated with the picture of the face to the identified gateways for storage in the respective gateways.

Figure 4:
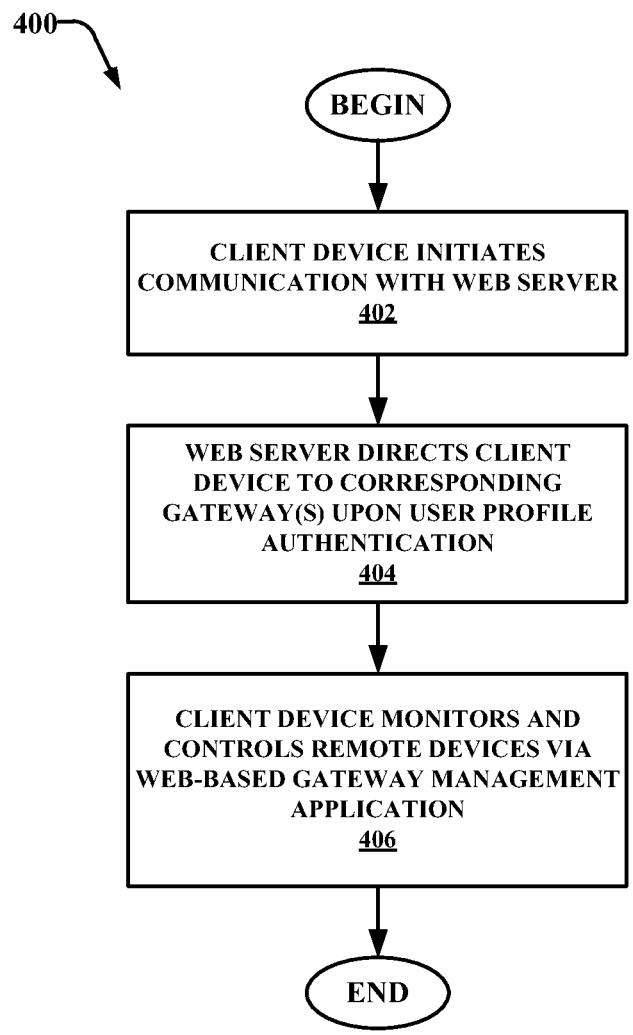
FIG. 4 is a flow chart of one example embodiment of a method for monitoring and controlling devices attached to a gateway.

FIG. 4 is a flow chart of one embodiment of an example method for monitoring and controlling devices attached to a gateway. At 402, a user at a client device initiates communication with a web server to access monitoring data from the devices connected to a gateway. At 404, the web server directs the client device to the corresponding gateway based on the user profile of the user at the client device. At 406, the client device is able to monitor and control from a central interface monitoring and controlling devices connected to the identified gateway(s). In one embodiment, the client device receives an aggregated view of all security devices from several correlated gateways by communicating with only one gateway.

Figure 5:
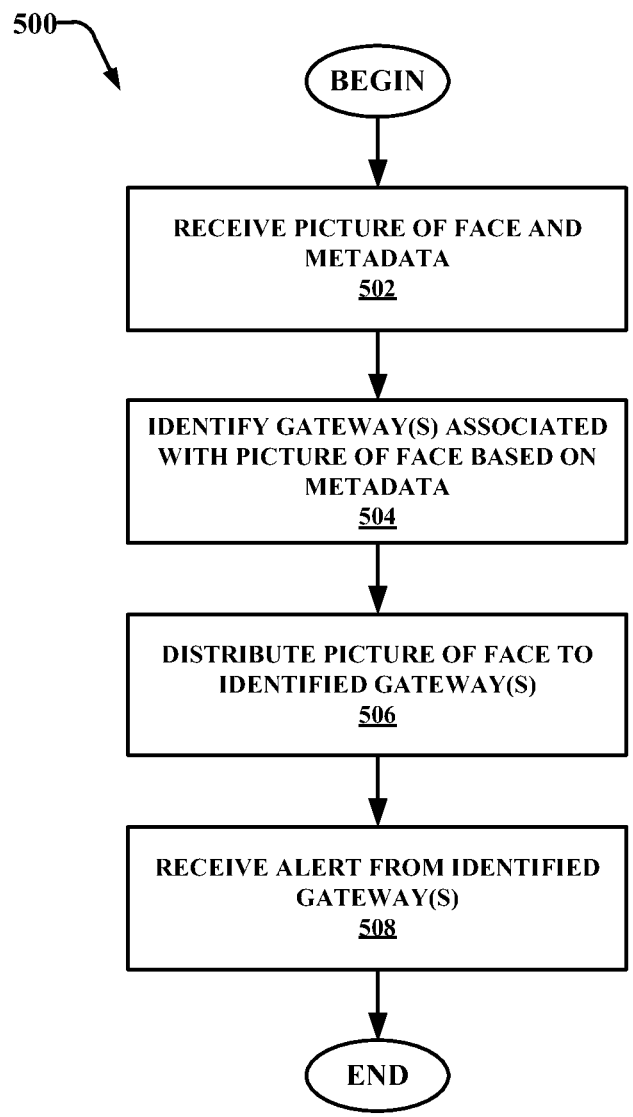
FIG. 5 is a flow chart of one example embodiment of a method for distribution of facial identification from a web server to select gateways.

FIG. 5 is a flow chart of one example embodiment of a method for distribution of facial identification from a web server to select gateways. At operation 502, a web server receives a picture of a face and its associated metadata from a source. At operation 504, the web server identifies gateways based on the metadata. At operation 506, the web server distributes the picture of the face to the identified gateways for processing. If a gateway generates a positive match, the web server receives an alert from the corresponding gateway.

Figure 6:
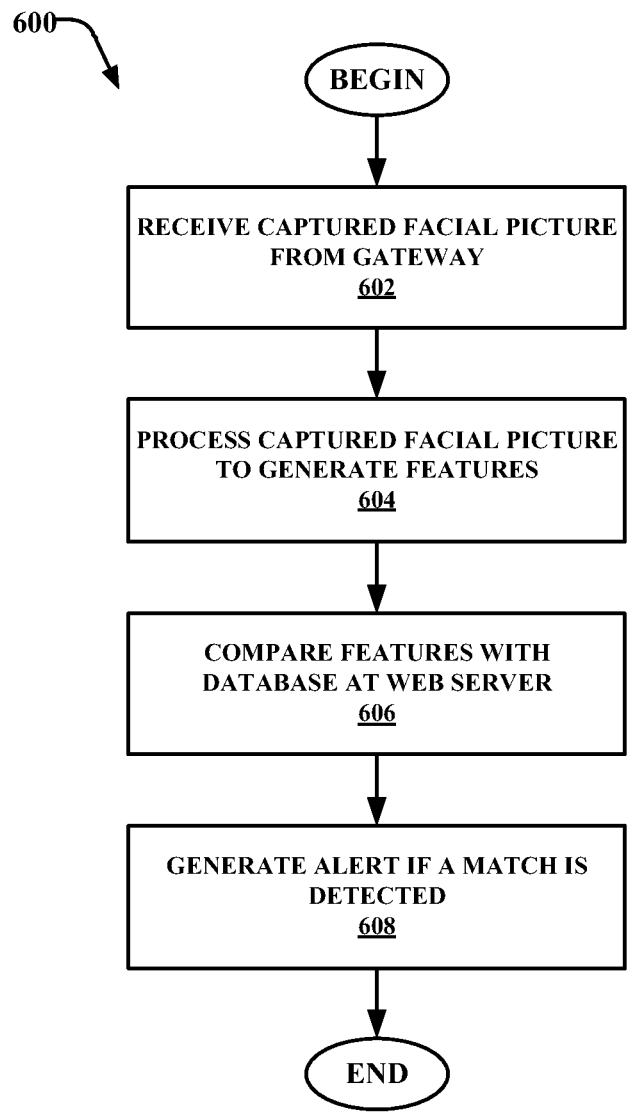
FIG. 6 is a flow chart of one example embodiment of a method for processing a facial recognition at a web server.

FIG. 6 is a flow chart of one example embodiment of a method for processing a facial recognition at a web server. At operation 602, a web server receives a captured facial picture from a gateway. At operation 604, the web server processes the captured facial picture to generate facial features. At operation 606, the web server compares the facial features with a database from the web server. At operation 608, the web server generates an alert if a match is detected. In one embodiment, if the match is inconclusive or if it is determined to be near match (e.g., 80% or more), a notification may still be generated to the gateway or another associated or related gateway, the web server, or a client device.

Figure 7:
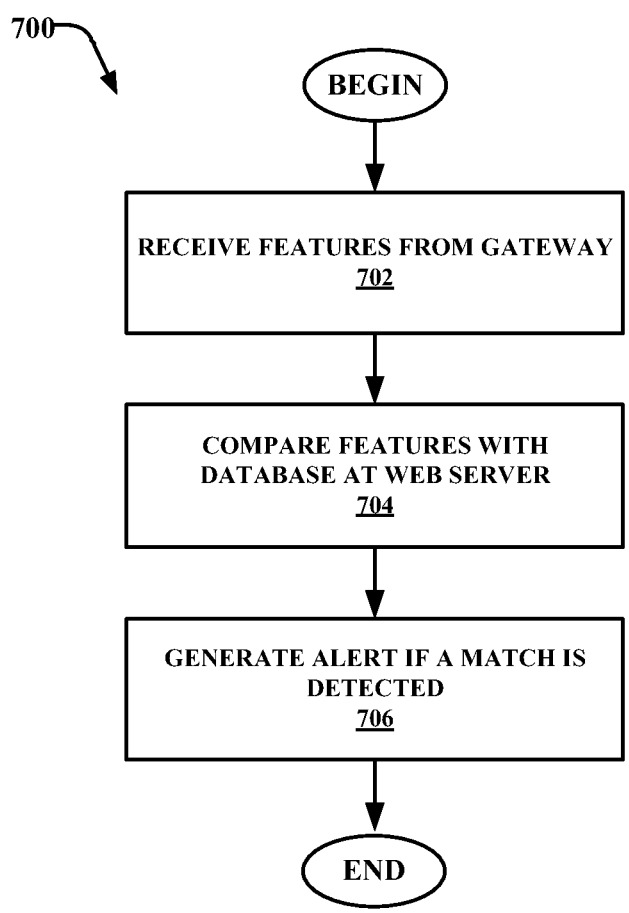
FIG. 7 is a flow chart of another example embodiment of a method for processing a facial recognition at a web server.

FIG. 7 is a flow chart of another example embodiment of a method for processing a facial recognition at a web server. At operation 702, the web server receives facial features from a gateway. At operation 704, the web server compares the facial features with a database of the web server. At operation 706, the web server generates an alert if there is a match is detected.

Figure 8:
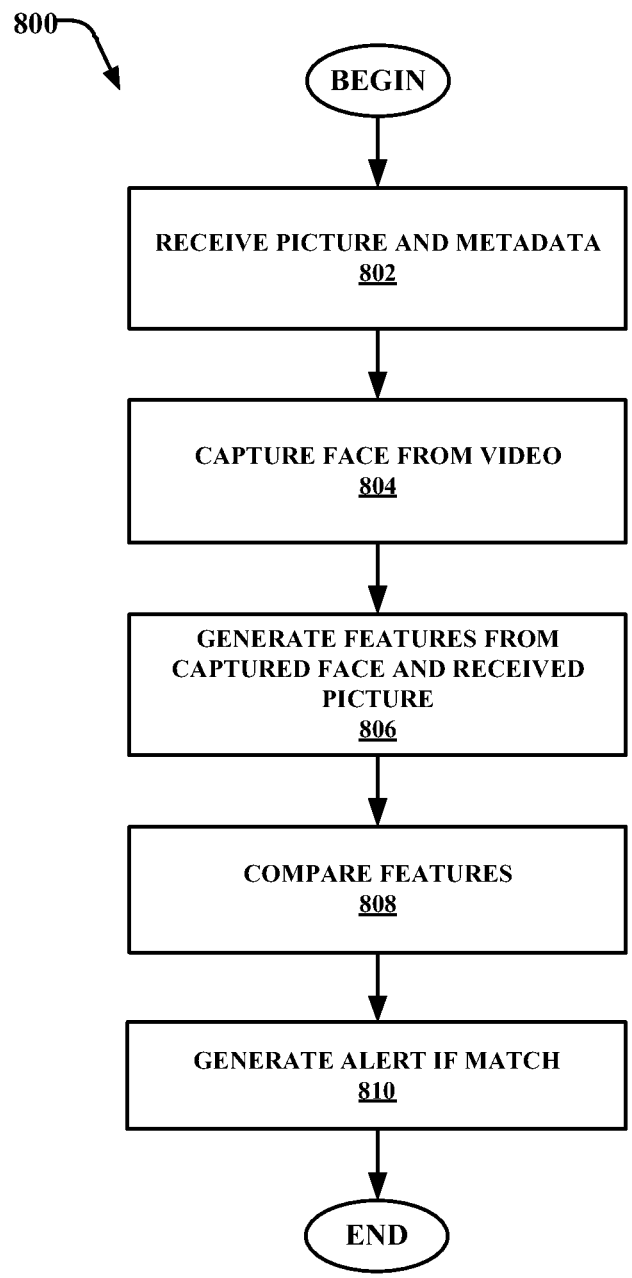
FIG. 8 is a flow chart of an example embodiment of a method for processing a facial recognition at a select gateway.

FIG. 8 is a flow chart of an example embodiment of a method for processing a facial recognition at a select gateway. At operation 802, a gateway receives a picture and a corresponding metadata. At operation 804, the gateway captures a face from a video feed. At operation 806, the gateway generates facial features from the captured face and the received picture. At operation 808, the gateway compares the facial features. At operation 810, the gateway generates an alert if a match is detected.

Figure 9:
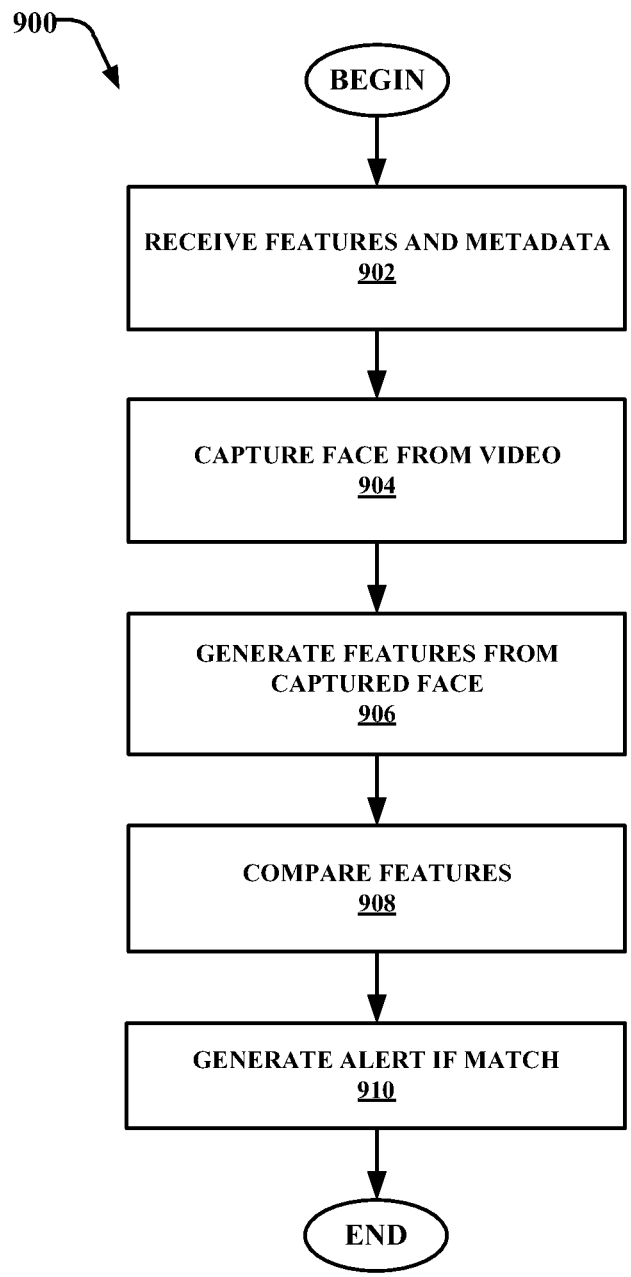
FIG. 9 is a flow chart of another example embodiment of a method for processing a facial recognition at a select gateway.

FIG. 9 is a flow chart of another example embodiment of a method for processing a facial recognition at a select gateway. At operation 902, a gateway receives facial features and corresponding metadata. At operation 904, the gateway captures a face from a video feed. At operation 906, the gateway generates facial features from the captured face. At operation 908, the gateway compares the facial features. At operation 910, the gateway generates an alert if a match is detected.

Figure 10:
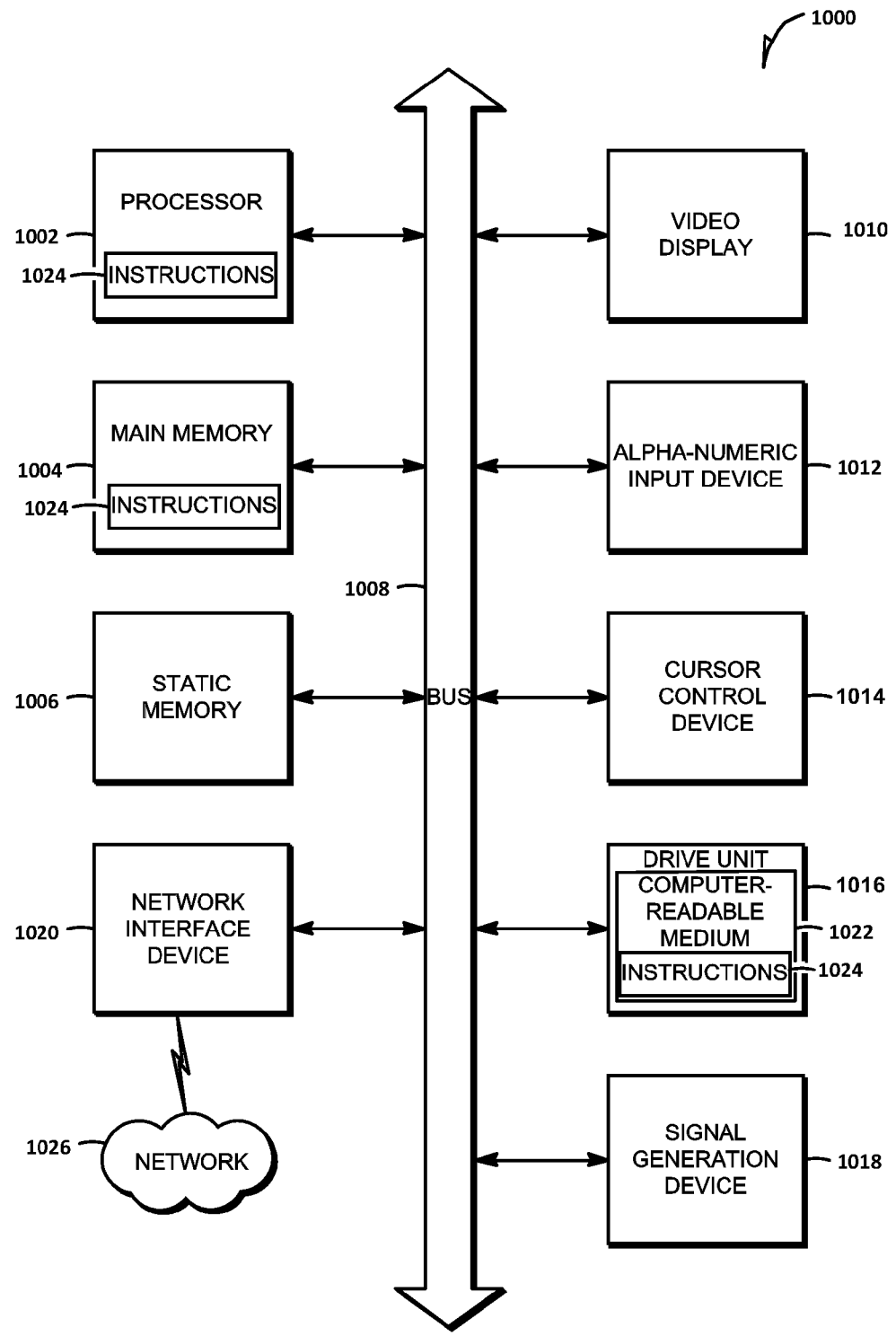
FIG. 10 shows a diagrammatic representation of machine in the example form of a computer system within which a set of instructions may be executed to cause the machine to perform any one or more of the methodologies discussed herein.

FIG. 10 shows a diagrammatic representation of machine in the example form of a computer system 1000 within which a set of instructions may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions and data structures (e.g., software 1024) embodying or utilized by any one or more of the methodologies or functions described herein. The software 1024 may also reside, completely or at least partially, within the main memory 1004 and/or within the processor 1002 during execution thereof by the computer system 1000, the main memory 1004 and the processor 1002 also constituting machine-readable media.

The software 1024 may further be transmitted or received over a network 1026 via the network interface device 1020 utilizing any one of a number of well-known transfer protocols (e.g., HTTP).

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical media, and magnetic media.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
a plurality of gateways, each gateway coupled to a video recording device; and
a web server associated with the plurality of gateways, the web server configured to identify one or more gateways of the plurality of gateways using metadata associated with a picture of a face, and to distribute the picture of the face to the identified gateways based on the metadata, the metadata comprising an identification of the picture of the face, an identification of a source of the picture, and a geographic location of interest,
the web server comprising:
a facial receiver module configured to receive the picture of the face and the metadata from one or more sources;
a facial recognition engine configured to determine facial features from the picture of the face;
a gateway identifier module configured to identify the one or more gateways using the metadata associated with the picture of the face, the gateway identifier module implemented using a processor of the web server;
a facial distribution module configured to communicate the picture of the face to the identified one or more gateways;
a web-based gateway management module configured to identify a first gateway based on a user profile at a client device, to authenticate with the client device based on the user profile, to authenticate with the first gateway, and to correlate the first gateway with a second gateway based on the user profile;
a transport module configured to enable peer-to-peer communication between the first gateway, the second gateway, the client device, and the web server; and
a storage device to store the picture of the face, the metadata, and the facial features in different groups based on the metadata, the groups organized by geographic areas, each gateway associated with a corresponding group and a geographic area.

2. The system of claim 1, wherein the facial distribution module communicates the facial features from the picture of the face to the identified one or more gateways.

3. The system of claim 1, wherein the facial receiver module is configured to receive a captured picture of a face from the one or more identified gateways, wherein the facial recognition engine is configured to determine facial features from the captured picture of the face and compare the facial features from the captured picture of the face with the facial features from the picture of the face.

4. The system of claim 1, wherein the facial receiver module is configured to receive facial features from a captured picture of a face from the one or more identified gateways, wherein the facial recognition engine is configured to compare the facial features from the captured picture of the face with the facial features from the picture of the face.

5. The system of claim 1, wherein each gateway comprises:
a gateway facial receiver module configured to receive the picture of the face and the metadata from the web server;
a gateway facial capture module configured to capture a picture of a face with the video recording device; and
a gateway facial recognition module configured to determine facial features from the captured picture of the face and from the picture of the face received from the web server, and to compare the facial features from the captured picture of the face with the facial features from the picture of the face received from the web server.

6. The system of claim 1, wherein each gateway comprises:
a gateway facial receiver module configured to receive facial features and the metadata from the web server;
a gateway facial capture module configured to capture a picture of a face with the video recording device; and
a gateway facial recognition module configured to determine facial features from the captured picture of the face, and to compare the facial features from the captured picture of the face with the facial features received from the web server.

7. The system of claim 1, wherein each gateway comprises:
a gateway facial capture module configured to capture a picture of a face with the video recording device and communicate the captured picture of the face to the web server.

8. The system of claim 1, wherein each gateway comprises:
a gateway facial capture module configured to capture a picture of a face with the video recording device; and
a gateway facial recognition module configured to determine facial features from the captured picture of the face and to communicate the captured picture of the face to the web server.

9. The system of claim 1, wherein the web server further comprises:
an application programming interface (API) to interface the gateway with a client device;
an application module to monitor or control a security device coupled to the gateway;
a device driver to enable interaction of the application module with the corresponding security device;
a communication module configured to enable communication with a web server, the client device, and other gateways, to receive additional APIs, respective application modules, and respective device drivers, and to copy a configuration of the gateway to other gateways;
a remote device management module configured to aggregate monitoring data from the security device and from other security devices respectively coupled to other gateways correlated with the gateway by the web server, and to enable the client device to monitor or control the security device coupled to the respective gateway,
wherein the communication module comprises:
 a user authentication module configured to authenticate a user at the client device based on a user profile of the user;
 a user access policy module configured to limit or grant the user at the client device access to the security device; and
 a web server authentication module configured to authenticate a communication between the gateway and the web server;
wherein the remote device management module comprises:
 an analytics module configured to analyze audio, video, and data from the security device and to generate events based on the analysis;
 an event aggregation module configured to aggregate events generated from the analytics module;
 an event-based control module configured to communicate a command to the security device of the corresponding gateway based on an event identified in the aggregated events based on an event configuration; and
 a client-based control module configured to communicate a command to the security device of the corresponding gateway based on a command communicated from the client device,
wherein the web server comprises:
 a gateway directory manager configured to identify a gateway associated with a user profile;
 a user authentication module configured to authenticate with the user at the client device based on the user profile; and
 a gateway authentication module configured to authenticate the identified gateway,
wherein the gateway directory manager comprises a service manager module configured to enable an add-on service to the user at the client device.

10. A method comprising:
identifying one or more gateways using metadata associated with a picture of a face to, each gateway coupled to a video recording device;
distributing the picture of the face to the identified gateways based on the metadata, the metadata comprising an identification of the picture of the face, an identification of a source of the picture, and a geographic location of interest;
receiving the picture of the face and the metadata from one or more sources;
determining facial features from the picture of the face;
identifying, using a processor of the web server, the one or more gateways using the metadata associated with the picture of the face;
communicating the picture of the face to the identified one or more gateways;
identifying a first gateway based on a user profile at a client device;
authenticating with the client device based on the user profile;
authenticating with the first gateway;
correlating the first gateway with a second gateway based on the user profile;
enabling peer-to-peer communication between the first gateway, the second gateway, the client device, and the web server; and
storing the picture of the face, the metadata, and the facial features in different groups based on the metadata in a storage device, the groups organized by geographic areas, each gateway associated with a corresponding group and a geographic area.

11. The method of claim 10, further comprising:
communicating the facial features from the picture of the face to the identified one or more gateways.

12. The method of claim 10, further comprising:
receiving a captured picture of a face from the one or more identified gateways;
determining facial features from the captured picture of the face; and
comparing the facial features from the captured picture of the face with the facial features from the picture of the face.

13. The method of claim 10, further comprising:
receiving facial features from a captured picture of a face from the one or more identified gateways; and
comparing the facial features from the captured picture of the face with the facial features from the picture of the face.

14. The method of claim 10, further comprising:
receiving at the identified gateways, the picture of the face and the metadata from the web server;
capturing a picture of a face with the video recording device at the identified gateways;
determining at the identified gateways, facial features from the captured picture of the face and from the picture of the face received from the web server; and
comparing at the identified gateways, the facial features from the captured picture of the face with the facial features from the picture of the face received from the web server.

15. The method of claim 10, further comprising:
receiving at the identified gateways facial features and the metadata from the web server;
capturing a picture of a face with the video recording device at the identified gateways;
determining at the identified gateways, facial features from the captured picture of the face; and
comparing at the identified gateways, the facial features from the captured picture of the face with the facial features received from the web server.

16. The method of claim 10, further comprising:
capturing a picture of a face with the video recording device at the identified gateways; and
communicating the captured picture of the face to the web server.

17. The method of claim 10, further comprising:
capturing a picture of a face with the video recording device at the identified gateways;
determining at the identified gateways, facial features from the captured picture of the face; and
communicating the captured picture of the face to the web server.

18. A non-transitory computer-readable storage medium storing a set of instructions that, when executed by a processor, cause the processor to perform operations, comprising:
identifying one or more gateways using metadata associated with a picture of a face, each gateway coupled to a video recording device;
distributing the picture of the face to the identified gateways based on the metadata, the metadata comprising an identification of the picture of the face, an identification of a source of the picture, and a geographic location of interest;

receiving the picture of the face and the metadata from one or more sources;
determining facial features from the picture of the face;
identifying the one or more gateways using the metadata associated with the picture of the face;
communicating the picture of the face to the identified one or more gateways;
identifying a first gateway based on a user profile at a client device;
authenticating with the client device based on the user profile;
authenticating with the first gateway;
correlating the first gateway with a second gateway based on the user profile;
enabling peer-to-peer communication between the first gateway, the second gateway, the client device, and the web server; and
storing the picture of the face, the metadata, and the facial features in different groups based on the metadata in a storage device, the groups organized by geographic areas, each gateway associated with a corresponding group and a geographic area.

* * * * *